United States Patent [19]

Peterson et al.

[11] Patent Number: 4,757,399
[45] Date of Patent: Jul. 12, 1988

[54] FLEXIBLE CASSETTE FOR USE WITH A REEL PERIPHERY DRIVEN TRANSPORT

[75] Inventors: Dean M. Peterson, Escondido; Anthony J. de Ruyter, Bonita, both of Calif.

[73] Assignee: Eastman Kodak Company, Rochester, N.Y.

[21] Appl. No.: 865,310

[22] Filed: May 21, 1986

[51] Int. Cl.⁴ .................. G11B 5/008; G11B 15/00; G11B 17/00
[52] U.S. Cl. .................. 360/96.5; 242/199; 360/132
[58] Field of Search .............. 360/96.5, 96.1, 93, 360/132; 242/192, 197–201

[56] References Cited

U.S. PATENT DOCUMENTS

| 1,933,562 | 11/1933 | Michel | 88/17 |
|---|---|---|---|
| 3,252,669 | 5/1966 | Geri | 242/55.13 |
| 3,677,557 | 7/1972 | Ban | 274/4 B |
| 3,741,498 | 6/1973 | Siegemund | 242/199 |
| 3,910,692 | 10/1975 | Scibilia | 352/130 |
| 3,913,145 | 10/1975 | Wiig | 360/132 |
| 3,980,255 | 9/1976 | Serizawa | 242/198 |
| 4,231,532 | 11/1980 | Popov et al. | 242/199 |
| 4,272,795 | 6/1981 | Davis, Jr. et al. | 360/99 |
| 4,410,149 | 10/1983 | Armstrong | 242/200 |
| 4,494,161 | 1/1985 | Ogata et al. | 360/132 |
| 4,561,610 | 12/1985 | Gyi | 242/198 |
| 4,631,607 | 12/1986 | Katsumata | 360/96 S |

FOREIGN PATENT DOCUMENTS

| 0025914 | 4/1981 | European Pat. Off. . |
| 1131905 | 6/1962 | Fed. Rep. of Germany . |
| 3025536 | 1/1982 | Fed. Rep. of Germany . |
| 2116520 | 9/1983 | Fed. Rep. of Germany . |
| 2153732 | 5/1973 | France . |
| 2333316 | 6/1977 | France . |
| 2029372 | 3/1980 | United Kingdom . |
| 2105088 | 3/1983 | United Kingdom . |

Primary Examiner—John H. Wolff
Assistant Examiner—David J. Severin
Attorney, Agent, or Firm—Daniel Robbins

[57] ABSTRACT

A plastic cassette, having reel hub spindles and tape guides which are accurately machined inserts, is used as a tape supply and take-up container for a reel periphery driven tape transport. The reel hub spindle and the tape guide bases are accurately machined reference surfaces, and the spindles and guides are flexibly captive in the cassette shell with their reference surfaces extending below the cassette shell. Upon insertion into the transport, the reel hub spindle and tape guide bases are forced into abutment with a reference surface of the transport, causing the cassette tape path to conform to the transport tape path, substantially independent of the orientation of the plastic cassette body relative to the transport.

13 Claims, 8 Drawing Sheets

FLEXIBLE CASSETTE FOR USE WITH A REEL PERIPHERY DRIVEN TRANSPORT

BACKGROUND OF THE INVENTION

1. Field of the Invention

This invention relates to a precision linear magnetic tape transport system, and in particular to a transport system configured to use interchangeable, low cost tape cassettes.

2. Description Relative to the Prior Art

The invention, as well as the prior art, will be described with reference to the figures, of which.

Figure 1:
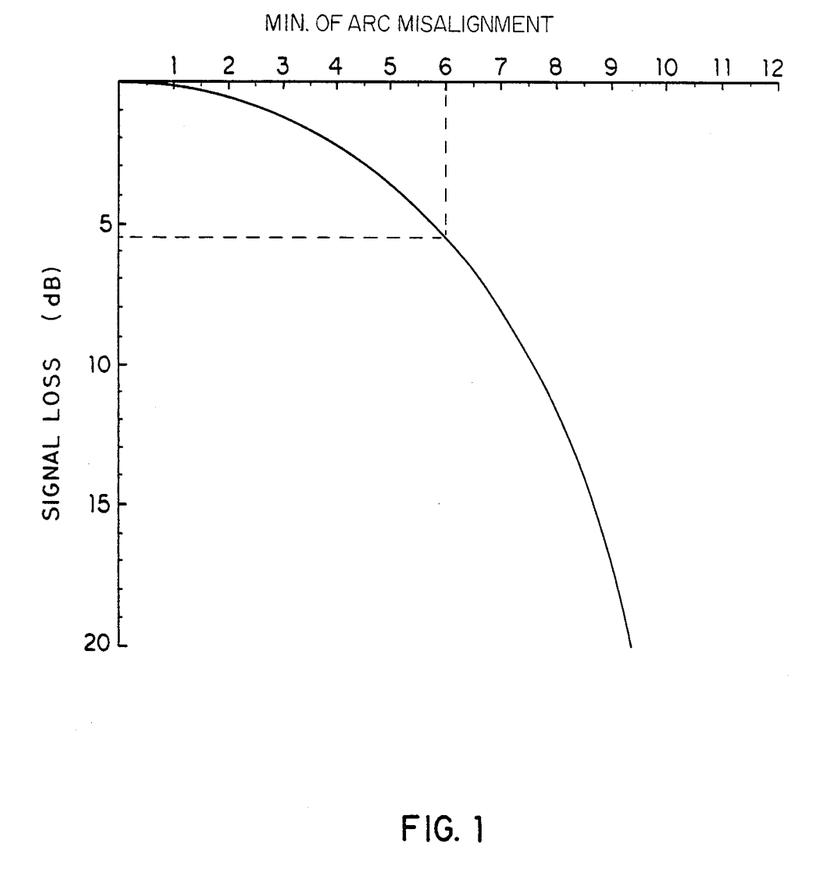
FIG. 1 is a graph relating to a problem addressed by the invention.

Precision linear magnetic tape transports are well known as key storage elements in instrumentation, computer and data handling applications. One such application is the storage of large quantities of video data in a motion analysis system such as the SP2000 Motion Analysis System, manufactured by the spin Physics Systems Division of the Eastman Kodak Company. Briefly, a motion analysis system comprises a video camera operating at frame rates of, say, 1000–2000 frames per second allowing the capture as electrical signals containing data of scenes containing high speed mechanical motions. These camera "signals" are recorded by means of a magnetic recording system utilizing a linear tape transport operating at a high tape velocity. A slow motion replay of an earlier recorded high speed event is obtained by reducing the tape velocity on playback and viewing (on a video monitor) scenes reproduced at the lower repetition rate. During recording the transport may run at tape speeds as high as 250 inches per second, and on playback at a speed as low as 7.5 inches per second. The recorder may record from 16 to 32 channels of information simultaneously (depending on system configuration) on $\frac{1}{2}$" wide magnetic tape with track widths of $10 \times 10^{-3}$ in.; and to accommodate the high video information content recorded on the tape, the recorded signal wavelengths may be as short as 30 microinches. For satisfactory recovery of the information recorded at high speed and played back at low speed it is essential that tape tracking and tape guiding be uniform over the indicated broad tape velocity range. For example, it is necessary that the variation of the angular displacement between any given recorded track on the tape and the playback transducer gap be held to an absolute minimum to avoid signal deterioration due to the known magnetic recording "alignment loss" effect ("The Complete Handbook of Magnetic Recording", Finn Jorgensen, p. 86 Tab Books, Inc. 1st Edition 1980). The loss due to angular misalignment is plotted in FIG. 1 for a track width of $10 \times 10^{-3}$ in. and for a 30 microinch recorded wavelength. FIG. 1 shows the rapidly increasing signal attenuation as the misalignment angle increases; a mere misalignment of 0.1 degrees (6 min. of arc) results in about a 6 dB loss or a 50 percent reduction in signal level. Similarly, a failure to position a recorded tape track widthwise with respect to a playback head will result in proportional signal loss. A linear misalignment of as little as $2 \times 10^{-3}$ inch relative to a track that is $10 \times 10^{-3}$ inch wide will result in a 2 dB loss (20 percent reduction) in signal level. It will be appreciated that precise mechanical control of the tape level at all speeds is essential to assure satisfactory system performance.

In addition to the above mechanical requirements, important economic considerations are imposed on the system design. It is economically desirable that a motion analysis system, which is relatively expensive, serve the needs of a multiplicity of users...such a system being essentially a general purpose laboratory instrument. The design goal, then, would be to allow each user to acquire, store and analyze his own data while sharing a single system with his associates. This requirement is best satisfied by providing the user with individually removable, inexpensive tape cassettes, allowing maximum utilization of the system.

The requirements of precision guidance and the use of low cost tape cassettes have been generally perceived as being mutually exclusive if the cassette itself is relied upon to provide any guiding of the tape. Precise guiding by means included within the cassette generally necessitates a precisely fabricated cassette and, attendantly, an expensive one. U.S. Pat. No. 4,410,419 issued October 1983 in the name of Armstrong, addresses this problem and provides one solution. The Armstrong patent teaches the building of all the precision guiding elements into the transport proper, with no guiding elements present in the cassette. The cassette is solely a container for the supply and take-up of the tape, and therefore may be non-precision and inexpensive to fabricate. On inserting the cassette into the Amrstrong transport, the transport mounted precision elements, which define the tape path and provide the tape guidance and tape driving, enter the body of the cassette and appropriately engage the tape. This entails the physical movement and re-positioning of certain tape guiding and tape driving elements, including the capstan of the transport. Since these elements are precision assemblies, this moveability adds cost and complexity to the transport; but because the technique allows the use of multiple inexpensive cassettes, the added transport cost is adequately offset by the cassette savings.

It would be advantageous to further reduce the cost by eliminating the need for precision moveable elements, such as the capstan, while retaining the use of an inexpensive cartridge. Brooks et al describes such a capstanless transport in U.S. Pat. No. 4,256,996 issued Mar. 17, 1981, albeit the Brooks transport is not cartridge-loaded. Transports that are both capstanless and cartridge-loaded are known in the art. One such transport is described in U.S. Pat. No. 4,095,758 issued June 20, 1978 in the name of Shroff.

The Shroff transport is a reel periphery driven machine with cartridge contained tape supply and take-up reels driven at their peripheries by means of pucks contacting the reels through apertures in the cartridge. The capstanless feature makes cartridge loading very straightforward; the tape path is considerably simplified in the absence of a capstan, and the tape may be placed in direct contact with the magnetic transducers and tape guides located on the transport by means of the cartridge.

The cartridge loading of the tape in the reel periphery driven design, however, introduces a new problem. In a tape transport, it is important that the tape path determining elements, e.g. tape guides and reel spindles, be accurately located with respect to a reference surface to which the transport tape guide elements and magnetic transducers are also referenced. This assures determinable and repeatable guidance of the tape past the transducers. In the Armstrong design and the Brooks design, described above, the guiding elements may be permanently affixed to the transport baseplate. This is not possible in the reel periphery driven cartridge loaded transport; the reel spindles and cartridge guides are integral with the cartridge, and are not "locked into" the mechanical reference surfaces of the transport by means of any direct connection. In the prior art, the reel periphery driven cartridge therefore, has been a rigid, precision fabricated and accurately assembled tape container, for it must precisely mate with reference surfaces on the transport to insure proper tape positioning and guidance.

Figure 2:
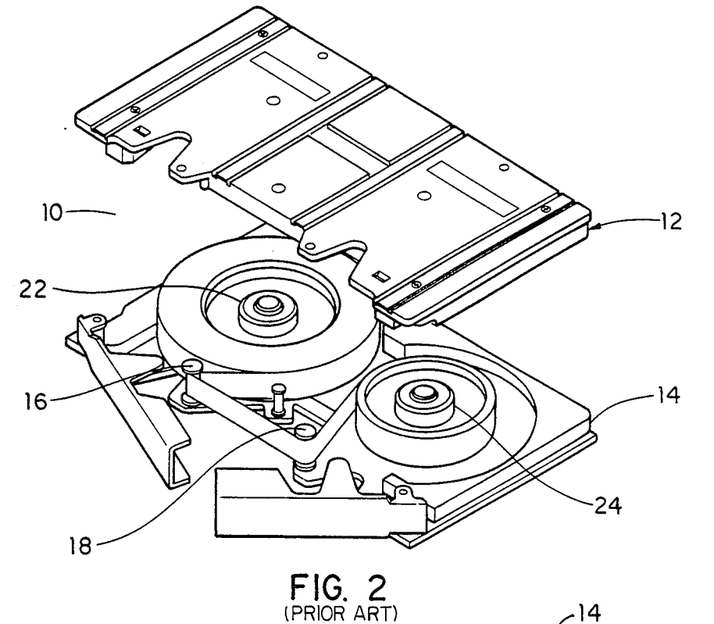
FIG. 2 is a perspective view of a tape cartridge known in the prior art for use with a reel periphery driven transport.

FIG. 2 illustrates a cartridge 10 known in the prior art (U.S. Pat. No. 4,095,758). The cartridge 10 is comprised of two metal castings 12, 14 which form the body of the cartridge. The inner surface of the lower casting 14 is machined to form reference surfaces below hubs 22, 24 and guides 16, 18. The lower casting 14 is then turned over (FIG. 3), and supported on the reference surfaces; and lands 26, 28, 30, 32 on the outer face of the cartridge casting 14 are milled to a precisely controlled depth relative to the reference surfaces previously machined on the inner surface of the casting 14. The tape guides 16, 18 and the hubs 22, 24 are respectively mounted on the inner machined reference surfaces with their axis aligned perpendicular to the reference surfaces.

Figure 3:
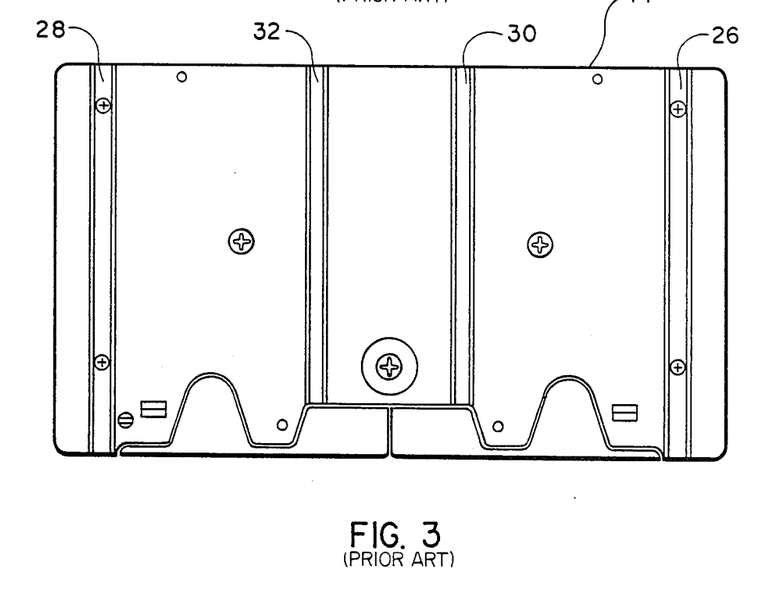
FIG. 3 is a plan view of the bottom of the cartridge of FIG. 2.

It will be appreciated that the fabrication and assembly of the above described cartridge entails a considerable amount of precision crafting. Not only are precision guides and hubs required, but parallelism and proper depth relationships must be maintained between the machined surfaces on both sides of the cartridge casting 14.

Figure 4:
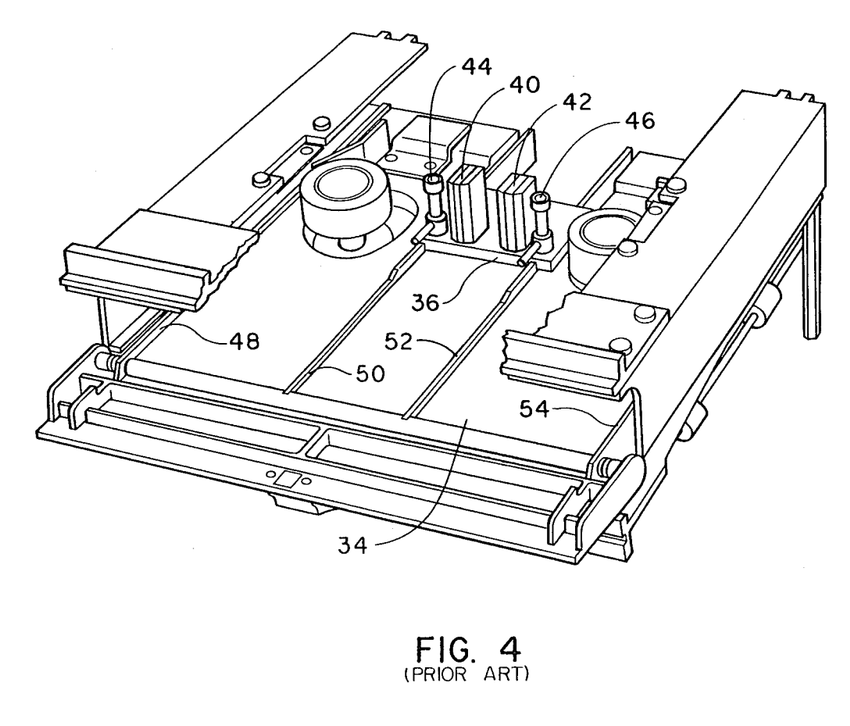
FIG. 4 is a perspective view of a reel periphery driven transport for use with the cartridge of FIG. 2, FIGS. 5A, 5B are perspective views of the cassette of the invention.

FIG. 4 illustrates a transport for use with the cartridge of FIG. 2. The transport comprises a baseplate casting 34 on which are mounted the other mechanical and electrical elements necesssary for transport operation. A precision plate 36 carrying a recording transducer 40, a playback transducer 42, and tape guides 44, 46 is mounted on a reference plane machined on the upper surface of the casting 34. It is essential that the cartridge 10, on insertion into the transport, position the tape to properly contact the magnetic transducers 40, 42. To accomplish this, linear guides 48, 50, 52, 54 are precisely located on the reference surface of baseplate casting 34. These guides contact the lands 26, 28, 30, 32 milled into the lower casting 14 as the cartridge is inserted into the transport. Pressure plates are located in the transport, and such plates maintain the lands 26, 28, 30, 32 in intimate abutment with the guides 48, 50, 52, 54 effecting the positioning of the cartridge relative to the tape guides 44, 46 and the magnetic transducers 40, 42 located on the transport.

SUMMARY OF THE INVENTION

In a cassette loaded reel periphery driven transport, rather than use of an expensive, precisely machined and precisely assembled cartridge parts whose major surfaces must accurately mate with extensive reference surfaces on a transport, an inexpensive molded plastic cassette with simple metallic inserts for use as tape guides and reel hub spindles serves as the container for the magnetic tape. The inserts are machined with their axes perpendicular to their bases, their "lower" faces serving as reference surfaces for the inserts. The inserts are not rigidly mounted in the cassette body, but are flexibly attached to the plastic shell of the cassette with the bases of the inserts slightly extending "below" the surface of the cassette. Ball bearing reel hubs are mounted on the reel hub spindles, and the tape is wound on the reel hubs. The cassette mates with a reel periphery driven transport having an accurately machined reference surface on its baseplate. When the cassette is inserted into the transport, the guide inserts and the reel hub spindle inserts are positioned over the reference surface of the transport baseplate, and pressure rollers located on the transport frame engage the upper surfaces of the cassette tape guide and reel hubs inserts. The pressure rollers force the inserts down against the corresponding reference surface of the transport. Because of the flexibility of the attachment to the cassette of the guide and reel hub spindle inserts, and because the orientation of the guides and reel hub spindles relative to the reference surface of the transport determine the tape path, the tape path becomes accurately established, independent of . . . and irrespective of . . . the exact orientation of the cassette shell relative to the transport baseplate. The fixed tape guides and the magnetic transducers mounted on the transport precision plate are aligned with respect to the same reference surface which positions the bases of the cassette inserts; "all" the elements both in the transport and cassette which are determinative of the location of the tape path are referenced to the same surface.

In view of the above, it will be appreciated that the invention entails the use of an inexpensive, non-precision cassette as a supply and take-up container for a transportable web; the cassette having precision guides and hubs flexibly mounted on, and extending through, a non-precision cassette shell. When the cassette is placed on a reel periphery driven web transport, the inserts are forced against the transport reference surface, and are so positioned as to accurately define the web path of the cassette relative to the transport, and to align the web supply and take-up guiding elements located in the cassette with the critical, tape path determining elements mounted on the transport.

DESCRIPTION OF THE INVENTION

Figure 5A:
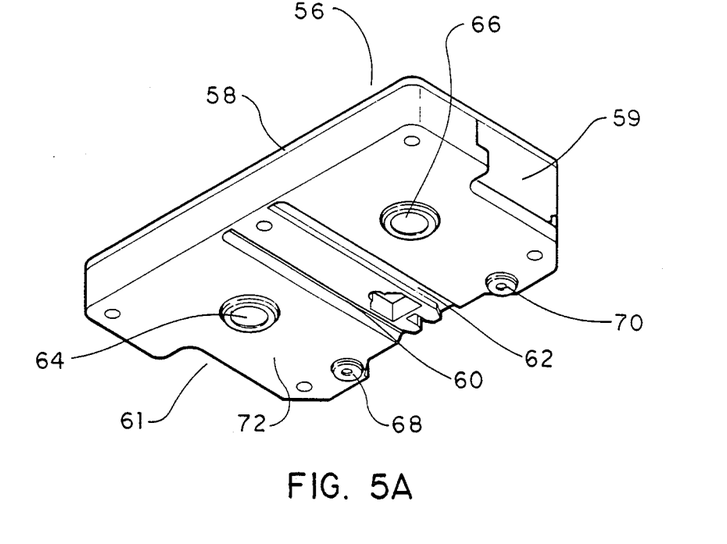
Figure 5B:
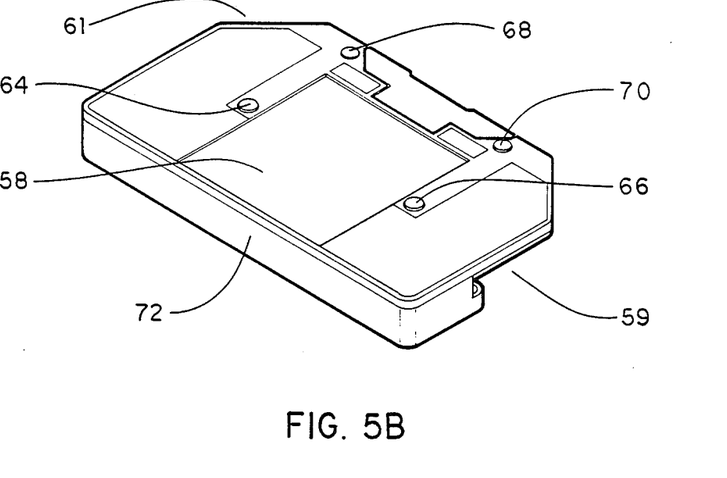
Figure 6:
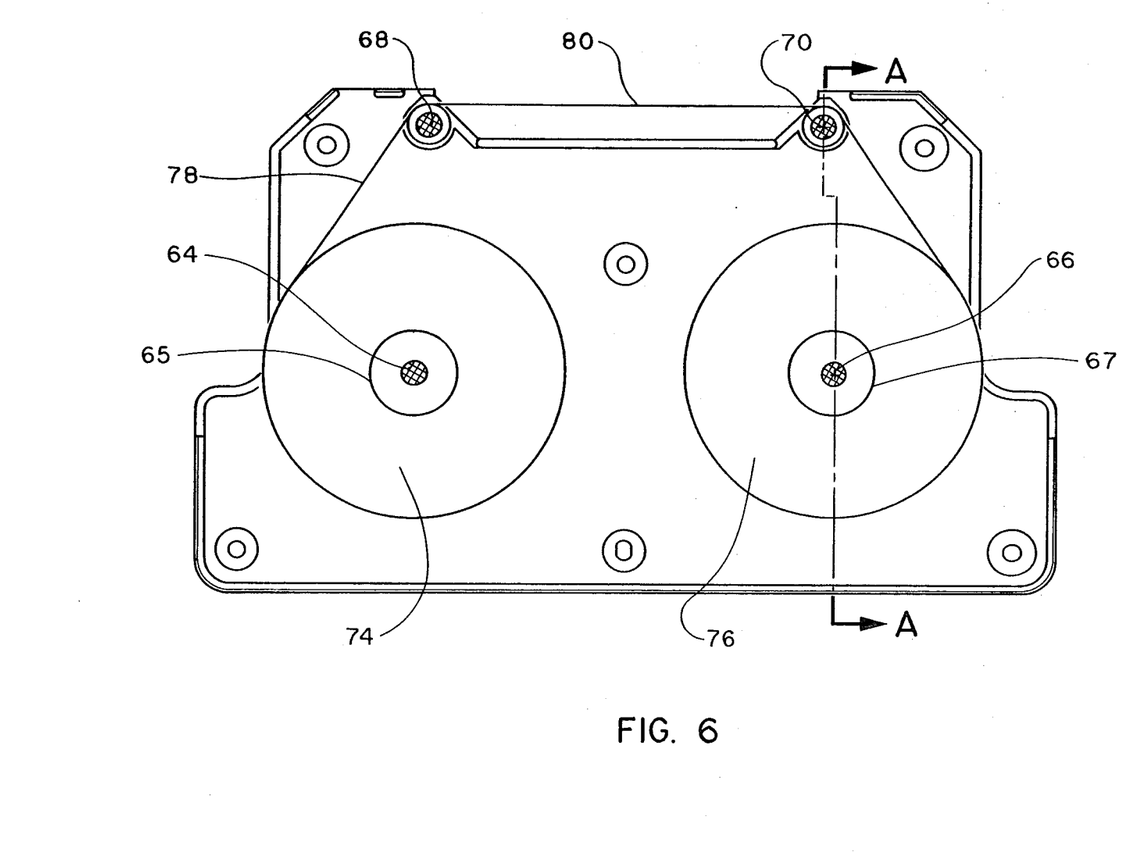
FIG. 6 is a plan view of the lower section of the cassette of FIGS. 5A, 5B.

Referring to FIGS. 5A and 5B, a cassette 56 embodying the present invention comprises an upper shell 58 and a lower shell 72 which mate together to form the cassette 56. The upper shell 58 and the lower shell 72 are fabricated from relatively "floppy" material, preferably molded plastic, that is somewhat rigid, but bendable under applied force. Reel hub spindles 64, 66 and tape guides 68, 70 are mounted on the lower shell 72 in a manner to be later described. In the assembled cassette 56, the top surfaces of the reel hub spindles 64, 66 and the tape guides 68, 70 extend above the upper surface of the cassette 56 (FIG. 5B). Similarly, the bottom surfaces of the reel hub spindles 64, 66 and tape guides 68, 70 extend below the lower surface of the cassette 56 (FIG. 5A). Additionally, the lower shell 72 is provided with lands 60, 62 which serve in guiding the cassette 56 upon insertion into an associated transport. Referring to FIG. 6, rotatable reel hubs 65, 67 are mounted on the reel hub spindles 64, 66 and a tape supply 74 is wound onto, say, the reel hub 64. During tape transportation, tape 78 is transferred from the supply 74 to the take-up 76 on the reel hub 67. (The foregoing specific designations "supply" and "take-up" are used for simplicity of description; the cassette 56 supports bi-directional operation, and each hub 65, 67 alternately acts as supply or take-up depending upon the direction of tape motion). The tape 78 is wound "recording surface out" on the hubs 65, 67 so that the recordable surface of the tape segment 80, supported between the guides 68, 70, faces in the direction away from the body of the cassette 56.

Figure 7:
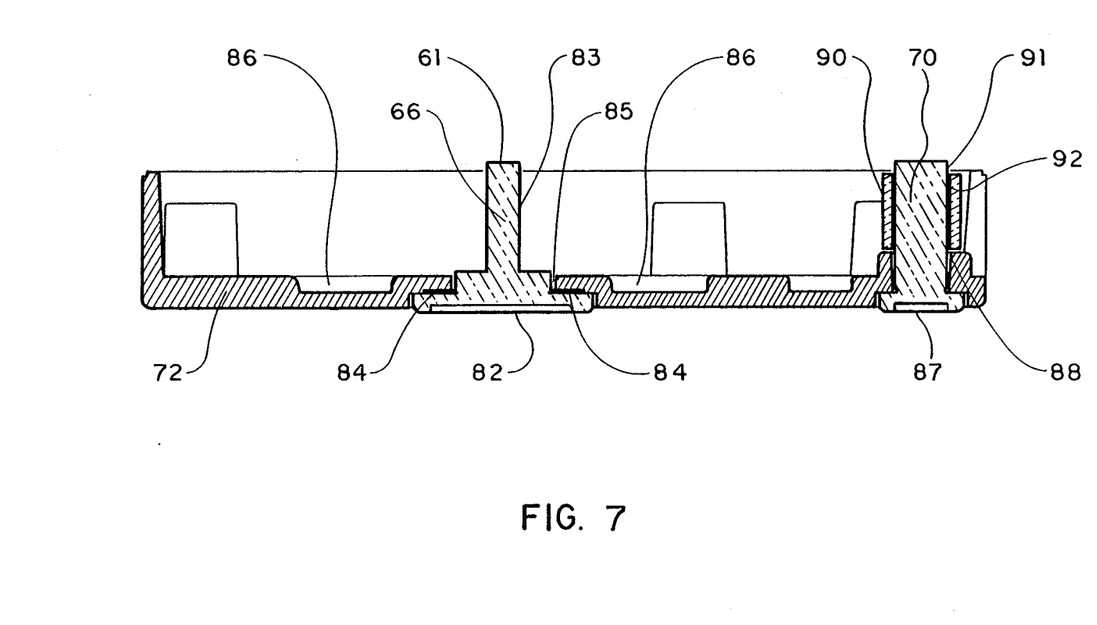
FIG. 7 is a sectional view taken along line A—A of FIG. 6.

Referring to FIG. 7 (Section A—A of FIG. 6), the method of mounting the reel hub spindle 66 and the tape guide 70 on the lower shell 72 will be described. (The tape 78 and the hubs 65, 67 are omitted from FIG. 7 to clarify showing the mounting of the elements in the lower shell 72.) The reel hub spindle 66 is a precision machined metal insert whose lower surface 82 is finished as a reference surface. The shaft 61 of the reel hub spindle insert 66 is precisely machined perpendicular to the reference surface 82. The reel hub spindle 66 is inserted into a corresponding hole 85 in the lower shell 72, and is secured to the lower shell 72 by an adhesive applied along the mating surface 84. The lower shell 72 is relieved, 86, in the vicinity of the reel hub spindle insert 66, and . . . importantly . . . the relief 86 of the lower shell 72 allows slight flexible changes of orientation of the reel hub spindle 66 relative to the lower shell 72. The tape guide 70 consists of a metallic insert in the form of a cylindrical post 91 having a reference surface machined on its lower surface 87, and a precision collar 90 whose surface 92 guides the tape. The cylindrical post 91 fits into an oversized, slightly tapered, hole 88 in the lower shell 72, and the precision collar 90 is so adhesively secured to cylindrical portion 70 that the entire tape guide is captive, but moveable. Because both reel hub spindle insert 66 and the tape guide assembly 70 are so mounted in the lower shell 72 that they move slightly relative to the shell 72 when the cassette 56 is inserted into an associated transport, the inserts 66, 70 are capable of being positioned relative to a reference surface of the transport "independent of the exact orientation of the cassette 56".

Figure 8:
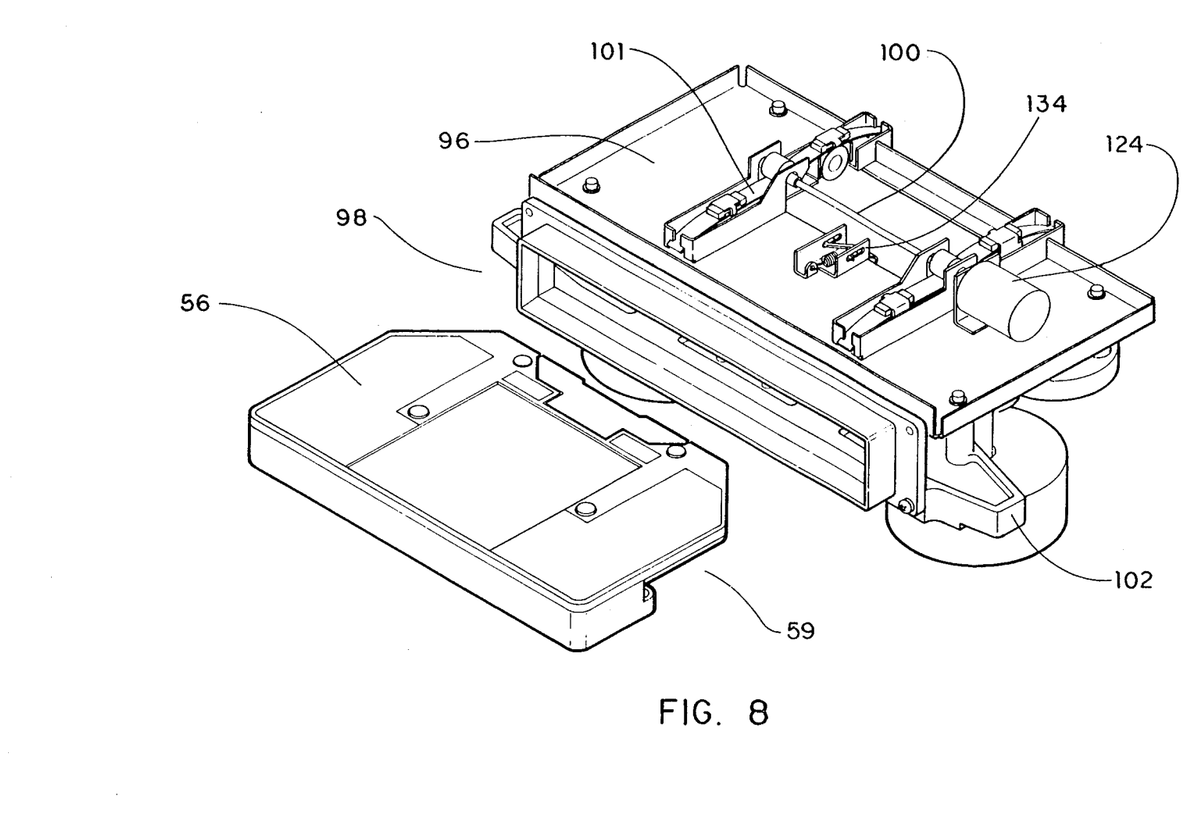
FIG. 8 is a perspective view of the cassette and transport of the invention.
Figure 9:
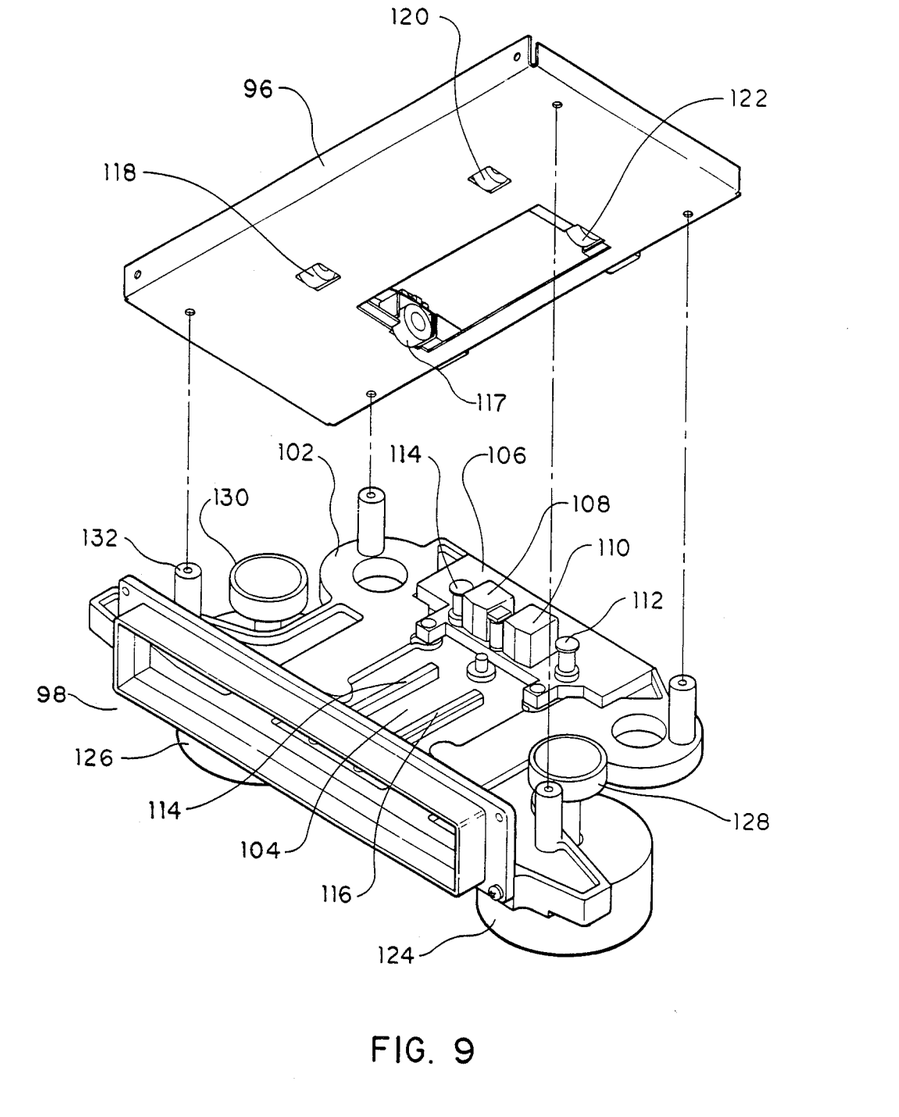
FIG. 9 is an exploded perspective view of the transport of the invention.

Referring to FIG. 8, the cassette 56 is shown in position to be inserted into a transport assembly 98. The transport assembly 98 has an upper frame 96 on which is mounted a force mechanism 100 for use in positioning elements of the cassette 56 onto the transport reference surface. Referring to FIG. 9, the transport assembly 98 is shown comprising the upper frame 96 and a baseplate assembly 102. The upper surface of the baseplate assembly 102 is a machined reference surface 104. Magnetic transducers 108, 110 and transport guides 112, 114 mounted on a precision plate 106 are all positioned relative to the reference surface 104. Linear guides 114, 116 are also mounted on the reference surface 104; these guides mate with the lands 60, 62 of the cassette to effect positioning of the cassette in a plane parallel to the reference surface 104. Pressure rollers 117, 118, 120, 122 are shown in the lower face of the frame 96, their operation to be later explained.

Referring again to FIG. 8, as the cassette 56 is inserted into the transport assembly 98, a detection mechanism 134 operates when the cassette 56 is fully engaged. One function of the detection mechanism 134 is to energize an actuator 124 which moves pressure rollers 117, 118, 120, 122 in the direction of the cassette. The top surfaces of the reel hub spindles 64, 66 and the cassette tape guides 68, 70 are now in position under the pressure rollers 117, 118, 120, 122 which apply normal forces on the reel hub spindles 64, 66 and the tape guide 68, 70, forcing them down against the reference plane 104 of the transport. Because the lower surfaces of the reel hub spindles 64, 66 and the cassette tape guides 68, 70 are precisely machined reference surfaces... and the shafts, e.g. 61, and the guide surfaces, e.g. 92...are perpendicular to their bases, the reel hubs spindles 64, 66 and the tape guides 68, 70 become oriented relative to the magnetic transducers 108, 110 and transport guides 112, 114 to conform to the required transport tape path. The exact orientation of the cassette 56 is immaterial; the slight moveability of the shell of the cassette 56 relative to the orientation of the reel hub spindles 64, 66 and the cassette tape guides 68, 70 renders the tape path substantially indepenent of the cassette 56 position.

With the cassette 56 in position, the drive pucks 128, 130 are spring loaded against the supply 74 and take-up 76 reels; the pucks entering the cassette 56 by means of cutouts 59, 61 in the body of the cassette 56. It will be appreciated that if the flexible attachment of the reel hub spindles 64, 66 to the lower cassette shell 72 provided no side resistance, the spindles 64, 66 would tip over by the forces exerted by the spring loaded pucks 128, 130. Side resistance to this movement is accomplished by the control of the amount of relief 86 (FIG. 7) provided in the cassette shell 72. Adequate relief 86 is provided to withstand the side thrust of the pucks 128, 130, while still allowing for flexing of the cassette shell 72 under the normal forces of the pressure rollers 118, 120 which engage the reel hub spindles 64, 66. By contrast, there are minimal side forces on the cassette tape guides 68, 70 (due only to components of the tape tension itself) allowing for the increased flexibility in the mounting of the cassette tape guides 68, 70.

The invention has been described in detail with particular reference to preferred embodiments thereof, but it will be understood that variations and modifications can be effected within the spirit and scope of the invention.

What is claimed is:

1. Magnetic recording and/or playback apparatus of the type employing a reel periphery driven tape transport and a removable cassette containing rotatable supply and take-up reels of magnetic tape wound on reel hubs and having a transportable tape segment extending between said supply and take-up reels, said apparatus comprising:
   a. a planar reference surface mounted on said transport to provide a transport reference surface,
   b. at least one magnetic transducer, positioned on said transport in relation to said transport reference surface, for recording and/or playback of signals on said tape segment,
   c. first and second transport mounted tape guides positioned in relation to said transport reference surface to establish a tracking path for said tape segment during tape transportation, d. a cassette comprised of an upper shell and of a lower shell for containing said supply and take up reels, e. first and second cylindrial reel hub spindles having said reel hubs mounted thereon, and having planar upper end surfaces perpendicular to the axes of said spindles and having planar base surfaces perpendicular to the axes of said spindles, f. first flexuous attachment means for attaching said reel hub spindles to said lower shell, wherein said reel hub spindles' base surfaces extend outside of said lower shell and slightly below the bottom surface of said lower shell, and said reel hub spindles are flexibly positionable relative to said lower shell, g. first and second cylindrical cassette tape guides, having planar upper end surfaces perpendicular to the axes of said cassette tape guides and having planar base surfaces perpendicular to the axes of said cassette tape guides, said cassettee tape guides disposed in said cassette for guidance of said tape segment, h. second flexous attachment means for attaching said cassette tape guides to said lower shell, wherein said cassette tape guide base surfaces extend outside of said lower shell and slighly below the bottom surface of said lower shell, and said cassette tape guides are flexibly positionable relative to said lower shell, i. means for extending said planar upper end surfaces of said reel hub spindles and said planar upper end surfaces of said cassette tape guides outside of said upper shell and slightly above the top surface of said upper shell of said cassette j. means for positioning said cassette in said transport, and k. means for the application of normal forces by said transport to said upper planar end surfaces of said reel hub spindles and to said upper planar end surfaces of said cassette tape guides to force abutment of said planar bases of said reel hub spindles and said planar bases of said cassette tape guides with said transport reference surface, wherein said reel hub spindles and said cassette tape guides position said tape segment in conformance with said tracking path, substantially independent of the orientation of said cassette relative to said transport reference surface.

2. The apparatus of claim 1 wherein said upper shell and said lower shell are plastic shells.

3. The apparatus of claim 2 wherein said means for application of normal forces comprises:
a. detection means for signalling position of said cassette in said transport,
b. an actuator responsive to said detection means, and
c. transport mounted pressure rollers disposed for engagement with said reel hub spindles and with said cassette tape guides for drivingly contacting said upper planar end surfaces of said reel hub spindles and said upper planar end surfaces of said cassette tape guides under control of said actuator, whereby said pressure rollers apply forces normal to said upper planar end surfaces of said reel hub spindles and said upper planar end surfaces of said cassette tape guides.

4. The apparatus of claim 3 wherein said detection means is an electrical switch.

5. The apparatus of claim 3 wherein said first flexuous attachment means comprises:
a. first and second areal segments of said lower shell, said first and second areal segments being bendable under applied force,
b. said first areal segment having a first aperture and said second areal segment having a second aperture there through respectively,
c. said first reel hub spindle being adhesively mounted to said first areal segment at said first aperture, and said second reel hub spindle being adhesively mounted to said second areal segment at said second aperture,
d. wherein said first and said second areal segments of said lower shell are flexed under force transmitted by said pressure rollers to said first and said second reel hub spindles.

6. The apparatus of claim 3 wherein said first and second cassette tape guides comprise:
a. first and second cylindrical tape guide bodies having first and second tape guide bases of greater diameters than said first and second tape guide bodies, and
b. first and second cylindrical collars fitting over said first and second tape guide bodies respectively and coaxially attached thereto, for contacting said magnetic tape.

7. The apparatus of claim 6 wherein said second flexuous attachment means comprises:
a. third and fourth areal segments of said lower shell,
b. said third areal segment and said fourth areal segments having first and second tapered apertures respectively wherein the minimum diameters of said first and said second tapered apertures are greater than the diameters of said first and said second tape guide posts respectively,
c. said minimum diameters of said first and said second tapered apertures are less than the outside diameters of said first and said second tape guide bases respectively,
d. said minimum diameters of said first and said second tapered apertures are less than the outside diameters of said first and said second collars respectively,
e. said first and said second tape guide bodies being mounted in said first and said second tapered apertures respectively with said tape guide bodies directed inwardly into said lower shell and said tape guide bases being below the bottom surface of said lower shell,
f. said first and said second collars being adhesively fastened to said first and said second tape guide bodies respectively, and
g. said first and said second cassette tape guides being held captive in said lower shell by said first and said second collars respectively, and by said first and said second bases respectively, and said first and said second collars being so positioned than small axial, radial, and tipping motions of said first and second cassette tape guides obtain.

8. For use in a reel periphery driven magnetic tape transport having a planar transport reference surface thereon, and having tape guiding elements cooperative in establishing a tape path relative to at least one magnetic transducer positioned relative to said transport reference surface, an improved cassette containing a pair of rotatable hubs for winding magnetic tape thereon, said cassette comprising:

a. a pair of substantially identical reel hub spindles in the form of right circular cylinders for mounting said rotatable hubs thereon, said reel hub spindles having flat reel hub spindle base surfaces and flat reel hub spindle top surfaces, b. a pair of substantially identical cylindrical cassette tape guides having flat cassette tape guide base surfaces and flat cassette tape guide top surfaces, said tape guide top surfaces and said tape guide base surfaces being perpendicular to the axes of said cylindrical cassette tape guides, c. an upper shell and a lower shell, d. first flexible attachment means for attaching said reel hub spindles to the bottom of said lower shell, wherein said flat reel hub spindle base surfaces extend through and slightly below the bottom surface of said lower shell, e. second flexible attachment means for attaching said cassette tape guides to the bottom of said lower shell, wherein said flat cassette tape guide base surfaces extend through and slightly below the bottom surface of said lower shell, and f. means for receiving normal forces externally supplied to said flat reel hub top surfaces and said flat cassette tape guide top surfaces when said cassette is cooperatively disposed for use with said transport so that said flat reel hub base surfaces and said flat cassette tape guide base surfaces are forced into abutment with said transport reference surface, and said reel hub spindles and said cassette tape guides are positioned to cooperate with said tape guiding elements of said transport in establishing said tape path, substantially independent of the orientation of said cassette relative to said transport reference surface.

9. The cassette of claim 8 wherein the recordable surface of said magnetic tape faces outwardly relative to said cassette.

10. The cassette of claim 8 wherein said upper shell and said lower shell are plastic materials.

11. The cassette of claim 10 wherein said second flexible attachment means comprises attachments of said cassette tape guides to said lower shell wherein said cassette tape guides are captively movable in said lower shell.

12. The cassette of claim 10 wherein said first flexible attachment means comprises attachment of said reel hub spindles to areal segments of said lower shell, said areal segments being bendable by said normal forces transmitted by said reel hub spindles.

13. The cassette of claim 12 wherein said areal segments comprise areal segments of said lower shell having reduced cross-sectional thicknesses relative to the nominal thickness of said lower shell, wherein said areal segments are elastically orientable relative to said lower shell.

* * * * *